(12) United States Patent
Kitahara et al.

(10) Patent No.: US 11,630,625 B2
(45) Date of Patent: Apr. 18, 2023

(54) PRINT CONTROL SERVER FOR PRINTER REGISTRATION OVER AN SNS

(71) Applicant: SEIKO EPSON CORPORATION, Tokyo (JP)

(72) Inventors: Yuma Kitahara, Ina (JP); Ryosuke Kakio, Matsumoto (JP); Takashi Sera, Shiojiri (JP); Yosuke Kawakami, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/447,080

(22) Filed: Sep. 8, 2021

(65) Prior Publication Data
US 2022/0075582 A1   Mar. 10, 2022

(30) Foreign Application Priority Data

Sep. 8, 2020   (JP) ............................ JP2020-150360

(51) Int. Cl.
   *G06F 3/12*       (2006.01)
   *H04L 12/58*     (2006.01)
   *H04L 51/48*     (2022.01)
   *H04L 51/52*     (2022.01)

(52) U.S. Cl.
   CPC .......... *G06F 3/1288* (2013.01); *G06F 3/1222* (2013.01); *G06F 3/1238* (2013.01); *H04L 51/48* (2022.05); *H04L 51/52* (2022.05)

(58) Field of Classification Search
   None
   See application file for complete search history.

(56) References Cited

U.S. PATENT DOCUMENTS

| 2019/0258431 A1* | 8/2019 | Yamamoto ............ G06F 3/1268 |
| 2019/0369924 A1* | 12/2019 | Oka ........................ H04L 51/02 |
| 2020/0133592 A1 | 4/2020 | Mitsuhashi et al. |

FOREIGN PATENT DOCUMENTS

JP            2020-071598 A        5/2020

* cited by examiner

*Primary Examiner* — Thomas D Lee
(74) *Attorney, Agent, or Firm* — Workman Nydegger (57) ABSTRACT

A print control server that controls printing via an SNS includes a display controller that causes, when a printer registration request is received from an account of a user of the SNS, an SNS server that manages the SNS to display, on a terminal device operated by the user, an input screen on which an e-mail address that uniquely identifies a printer is entered, an acquisition unit that acquires the e-mail address entered on the input screen, and a registration unit that refers to a database which specifies, in advance, a correspondence relationship with an e-mail address with respect to a plurality of printers and that registers, when the e-mail address acquired by the acquisition unit matches any e-mail address specified in the database, the account in association with the printer identified by the e-mail address acquired by the acquisition unit.

8 Claims, 8 Drawing Sheets

| SNS ACCOUNT | PRINTER E-MAIL ADDRESS |
|---|---|
| 1234abcd | xyz@print.ep.... |
| 5678efgh | pqr@print.ep.... |
| ******** | ***@print.ep.... |

| USER INFORMATION | PRINTER INFORMATION | PRINTER E-MAIL ADDRESS | PASSWORD | SNS ACCOUNT |
|---|---|---|---|---|
| AAA | *a** | xyz@print.ep.... | ***1 | 1234abcd |
| AAA | *b** | *f**@print.ep.... | ***2 | |
| AAA | *c** | *g**@print.ep.... | ***3 | |
| BBB | *d** | pqr@print.ep.... | ***4 | 5678efgh |
| CCC | *e** | *h**@print.ep.... | ***5 | |

PRINT CONTROL SERVER FOR PRINTER REGISTRATION OVER AN SNS

The present application is based on, and claims priority from JP Application Serial Number 2020-150360, filed Sep. 8, 2020, the disclosure of which is hereby incorporated by reference herein in its entirety.

BACKGROUND

1. Technical Field

The present disclosure relates to a print control server, a printing system, and a print control method.

2. Related Art

A user who uses a social networking service (hereinafter referred to as SNS) can post a file such as a text file or an image file to the SNS and publish the file for another user to view the post. The user can also use a printing system that communicates with the SNS via a network to print the file posted on the SNS by using a printer registered in advance in the printing system.

Also disclosed is an information processing device in which, in a case in which a user who has not registered a printer posts a print instruction to a chat room, when a message requesting printer registration is posted to the chat room and when the user posts a printer ID to the chat room in response to this posting, the printer ID is registered in association with the user and printing is performed using the registered printer (see JP-A-2020-71598).

In JP-A-2020-71598, posting of a printer ID to a chat is performed by capturing a code image indicating the printer ID. The user is required to activate the camera of a mobile terminal to capture the code image, and the printer ID cannot be posted when the code image is not at hand. Therefore, it is burdensome for the user to register the printer. In view of such a situation, there is a need for a device and a system that make it easier to register a printer to be used via an SNS.

SUMMARY

A print control server according to an aspect of the present disclosure controls printing via an SNS and includes a display controller that causes, when a printer registration request is received from an account of a user of the SNS, an SNS server that manages the SNS to display, on a terminal device operated by the user, an input screen on which an e-mail address that uniquely identifies a printer is entered, an acquisition unit that acquires the e-mail address entered on the input screen, and a registration unit that refers to a database which specifies, in advance, a correspondence relationship with an e-mail address with respect to a plurality of printers and that registers, when the e-mail address acquired by the acquisition unit matches any e-mail address specified in the database, the account in association with the printer identified by the e-mail address acquired by the acquisition unit.

A printing system according to an aspect of the present disclosure includes a first server communicably connected to an SNS and a second server that includes a database, which specifies, in advance, a correspondence relationship with an e-mail address that uniquely identifies a printer with respect to a plurality of printers communicably connected, and that causes a printer designated among the plurality of printers to perform printing. The first server causes, when a printer registration request is received from an account of a user of the SNS, an SNS server that manages the SNS to display, on a terminal device operated by the user, an input screen on which an e-mail address of a printer is entered, acquires the e-mail address entered on the input screen, and refers to the database and registers, when the e-mail address acquired matches any e-mail address specified in the database, the account in association with the printer identified by the e-mail address acquired.

A print control method according to an aspect of the present disclosure controls printing via an SNS and includes a display control step of causing, when a printer registration request is received from an account of a user of the SNS, an SNS server that manages the SNS to display, on a terminal device operated by the user, an input screen on which an e-mail address that uniquely identifies a printer is entered, an acquisition step of acquiring the e-mail address entered on the input screen, and a registration step of referring to a database that specifies, in advance, a correspondence relationship with an e-mail address with respect to a plurality of printers and registering, when the e-mail address acquired in the acquisition step matches any e-mail address specified in the database, the account in association with the printer identified by the e-mail address acquired in the acquisition step.

DESCRIPTION OF EXEMPLARY EMBODIMENTS

Hereinafter, an embodiment of the present disclosure will be described with reference to the drawings. The drawings are only an example for describing the embodiment. Since the drawings are an example, the ratio or shape may not be accurate, or the drawings may not be in agreement with each other or may be partially omitted.

1. System Configuration

Figure 1:
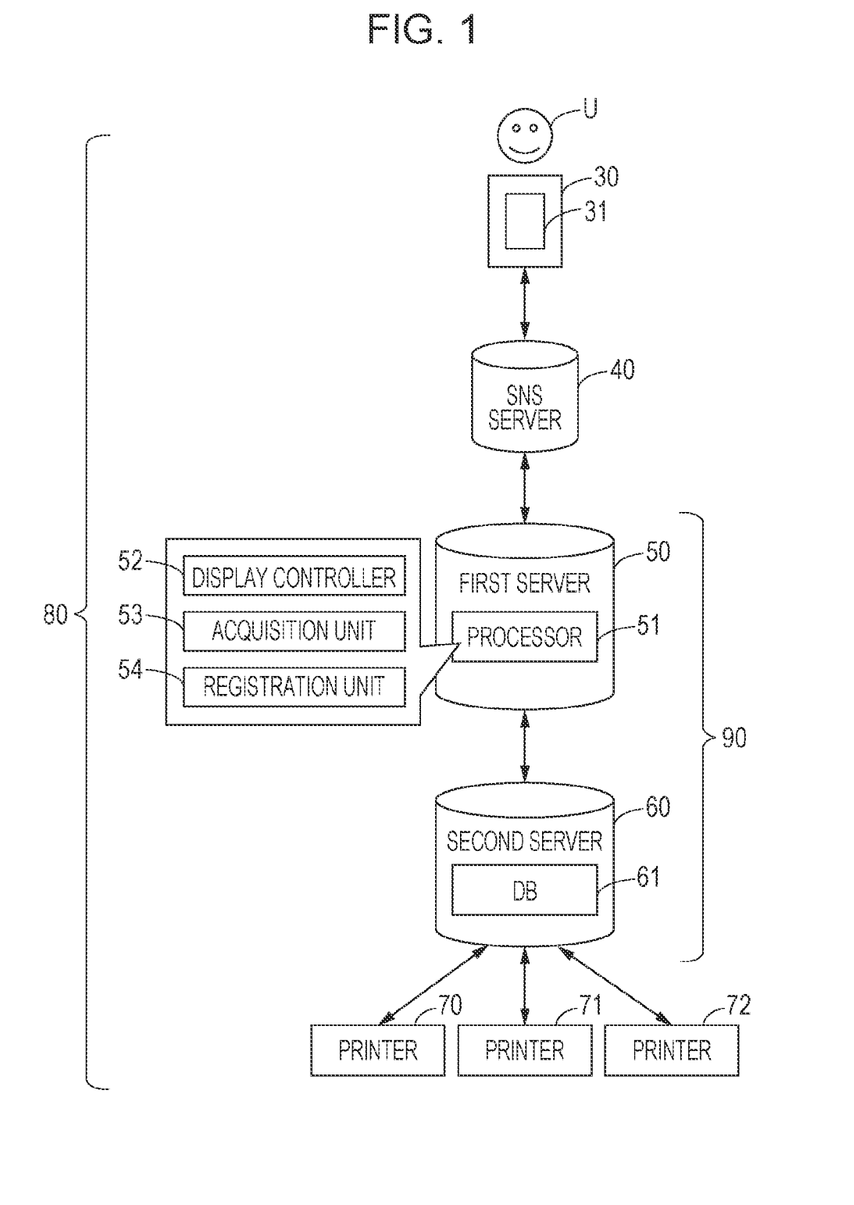
FIG. 1 is a block diagram showing a system in a simple manner.

FIG. 1 is a block diagram and simply shows the configuration of a system 80 according to the present embodiment. At least part of the system 80 is also referred to as a printing system 90. According to FIG. 1, the system 80 includes a terminal device 30, a plurality of servers 40, 50, and 60, and a plurality of printers 70, 71, 72, . . . . As shown in FIG. 1, the terminal device 30, the servers 40, 50, and 60, and the printers 70, 71, 72, . . . are communicably connected to each other via the Internet, when necessary. In the example of FIG. 1, the printing system 90 includes a first server 50 and a second server 60.

Figure 2:
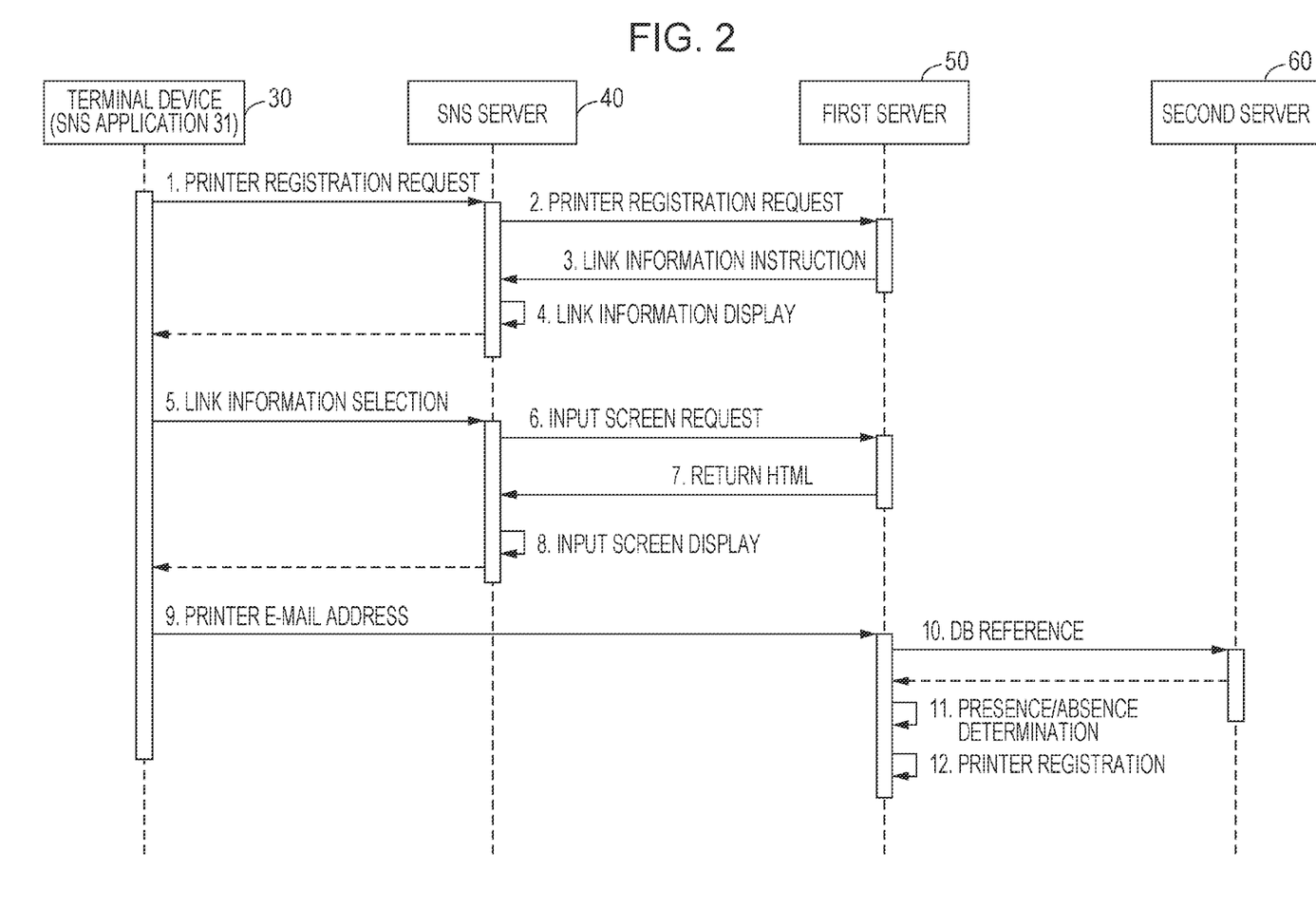
FIG. 2 is a sequence diagram showing a printer registration process.

The terminal device 30 is a communication device operated by a user U and is, for example, a smartphone, a tablet terminal, a personal computer (PC), or the like. Some applications are installed on the terminal device 30. In the example of FIG. 1, an SNS application 31 for an SNS is installed on the terminal device 30 as an example of the application. Hereinafter, an SNS is simply referred to as an SNS. In FIG. 2 and the like, the application is abbreviated as an "application".

The user U is a user of the SNS. The user U has an account for the SNS set up in advance. The account is information for identifying the user in the SNS and includes a user ID, a password, and other personal information. The SNS account may be abbreviated as "SNS user information". In the embodiment, when it is simply referred to as an account, it means an SNS account.

The user U uses the SNS by logging in to the SNS application 31 running on the terminal device 30 with an account. The SNS server 40 is a server or a plurality of servers for providing the SNS on the Internet. By the collaboration between the SNS server 40 and the SNS application 31, the SNS is provided to the user U who has an account.

The first server 50 is a server or a plurality of servers that can control printing via the SNS and performs control so that the printer associated with this account performs printing in response to posting a printing instruction from the account to the SNS. The first server 50 corresponds to a print control server. The print control server implements the print control method. The SNS application 31 exchanges information necessary for printing with the first server 50 via an application programming interface (API) provided by the SNS server 40. A processor 51 that controls the first server 50 functions as a display controller 52, an acquisition unit 53, a registration unit 54, and the like.

The second server 60 is a server or a plurality of servers that is communicably connected to a plurality of printers 70, 71, 72, . . . and controls printing by each printer. In the present embodiment, the second server 60 cooperates, via the SNS, with the first server 50 to implement printing desired by the user U. At least some of the functions of the second server 60 may be understood as corresponding to part of the print control server according to the present embodiment.

However, the second server 60 is also a server that provides a "predetermined printing service" that is independent of the SNS provided by the SNS server 40 and the first server 50. The second server 60 has a database 61. In the following, the database is abbreviated as a DB. The DB 61 specifies, in advance, a correspondence relationship with an e-mail address which uniquely identifies a printer with respect to a printer of the plurality of printers 70, 71, 72, . . . managed by the second server 60. Hereinafter, the e-mail address of the printer is referred to as a "printer e-mail address".

Each user of the print service provided by the second server 60 sends a print instruction containing a printer e-mail address to the second server 60 via the Internet, thereby causing a printer associated with the printer e-mail address to perform printing according to the print instruction. The print instruction containing a printer e-mail address is simply an e-mail message to be sent to the printer e-mail address. The second server 60 receives the e-mail message sent to the printer e-mail address of the printer managed by the second server 60. That is, when the second server 60 receives an e-mail message sent to the printer e-mail address of the printer managed by the second server 60 itself, the second server 60 causes the printer associated with to this printer e-mail address to perform printing instructed by this e-mail.

2. Printer Registration Process

Next, a printer registration process for associating the SNS user U with the printer will be described. The printer registration process is a prerequisite process for the user U to perform printing via the SNS.

FIG. 2 is a sequence diagram and shows a process according to each configuration in the system 80 related to the printer registration process. In FIG. 2, the process performed by the terminal device 30 is a process performed by the user U using his/her own account in a state where the SNS application 31 is running. The user U posts a printer registration request to the SNS in order to register a printer to be used in the SNS ("1. Printer registration request"). In this case, the printer registration request is transmitted from the SNS application 31 to the SNS server 40 by the user U using the account.

As can be seen from the description in "2. Printer registration request", the printer registration request received by the SNS server 40 is transmitted from the SNS server 40 to the first server 50. The display controller 52 of the first server 50 transmits "3. Link information instruction" to the SNS server 40 as a response to receiving the printer registration request from the SNS server 40. The link information instruction is a notification of link information that guides the user to an input screen on which the printer e-mail address is entered and an instruction to display the link information. The link information may be referred to as a hyperlink or a uniform resource locator (URL).

In response to the link information instruction, the SNS server 40 performs "4. Link information display". That is, the SNS server 40 cooperates with the SNS application 31 to cause the display unit of the terminal device 30 to display the link information so that the user U who is logging in to the SNS by using the account can visually recognize the link information.

When the user U uses the account and operates the terminal device 30 to tap or click the link information, "5. Link information selection" is transmitted from the SNS application 31 to the SNS server 40. The SNS server 40 that has received the link information selection transmits "6. Input screen request" to the first server 50. The display controller 52 transmits a Hypertext Markup Language (HTML) for displaying the input screen to the SNS server 40 as a response to receiving the input screen request from the SNS server 40 ("7. Return HTML").

In response to receiving the HTML as a response to the input screen request, the SNS server 40 performs "8. Input screen display". That is, the SNS server 40 causes the display unit of the terminal device 30 to display the input screen based on the HTML in cooperation with the SNS application 31 so that the user U who is logging in to the SNS by using the account can visually recognize the input screen.

Figure 3:
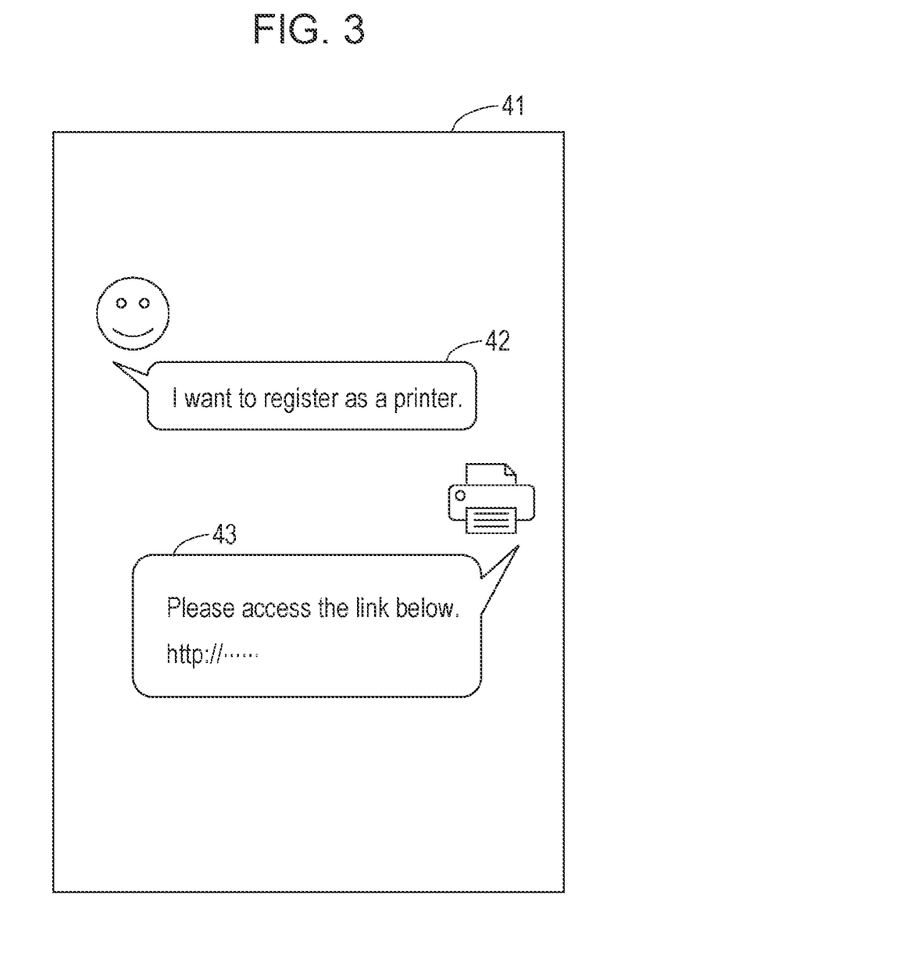
FIG. 3 is a diagram showing an example of a chat screen.

FIG. 3 shows an example of a chat screen 41 presented by the SNS to the user U. The chat screen 41 represents a chat developed on the SNS between the user U identified by the account and the first server 50 as the printing system 90. FIG. 3 is a diagram for specifically explaining the processes of Nos. 1 to 4 in FIG. 2.

When the user U posts a message 42 such as "I want to register a printer." on the chat screen 41, this message 42 is transmitted to the first server 50 as a printer registration request. In response to such a printer registration request, the display controller 52 transmits a link information instruction to the SNS server 40, so that a message 43 including the link information is displayed on the chat screen 41. When the user U taps or clicks the URL as the link information included in the message 43, the processes after No. 5 in FIG. 2 are executed.

Figure 4A:
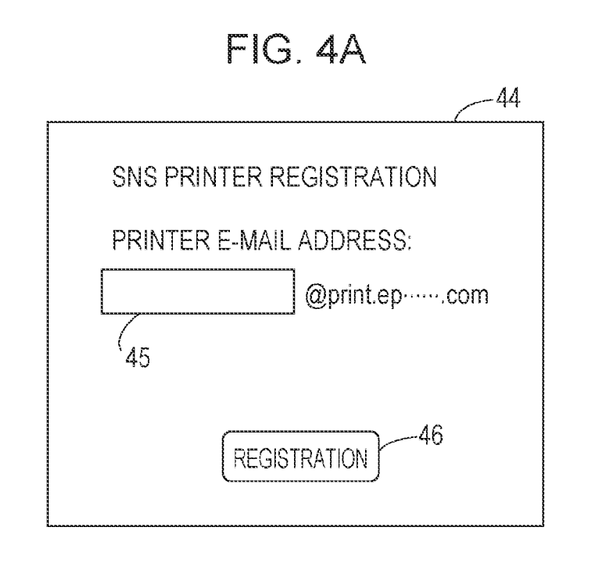
FIG. 4A is a diagram showing an example of an input screen.

FIG. 4A shows an example of an input screen 44 displayed as a result of "8. Input screen display" of FIG. 2. The input screen 44 includes an input field 45 for a printer e-mail address and a registration button 46. In the example of FIG. 4A, the domain part of the printer e-mail address is already described in the input field 45, and the user U does not need to input the domain part. Such a domain is a domain common to the printer e-mail addresses of the respective printers managed by the second server 60.

The user U operates the terminal device 30 to input a printer e-mail address. That is, the user U recognizes in advance a printer e-mail address of a printer that the user wants to associate with the account, enters this printer e-mail address in the input field 45 of the input screen 44, and presses down the registration button 46. When the registration button 46 is pressed, as shown in "9. Printer e-mail address" in FIG. 2, the printer e-mail address entered on the input screen 44, including the domain part, is transmitted from the account to the first server 50 via the SNS server 40. The acquisition unit 53 of the first server 50 acquires the printer e-mail address transmitted in this way.

In the first server 50, when the acquisition unit 53 acquires the printer e-mail address, the registration unit 54 performs "10. DB reference". That is, the registration unit 54 accesses the second server 60 to acquire information described in the DB 61. In the following, the printer e-mail address acquired by the acquisition unit 53 will be referred to as a "target printer e-mail address".

The registration unit 54 performs "11. Presence/absence determination" in which whether the target printer e-mail address matches any of the printer e-mail addresses specified in DB 61 is determined. The registration unit 54 performs "12. Printer registration" when the target printer e-mail address matches any of the printer e-mail addresses specified in the DB 61. That is, the registration unit 54 registers the account of the sender of the target printer e-mail address and the printer identified by the target printer e-mail address in association with each other.

Figure 5:
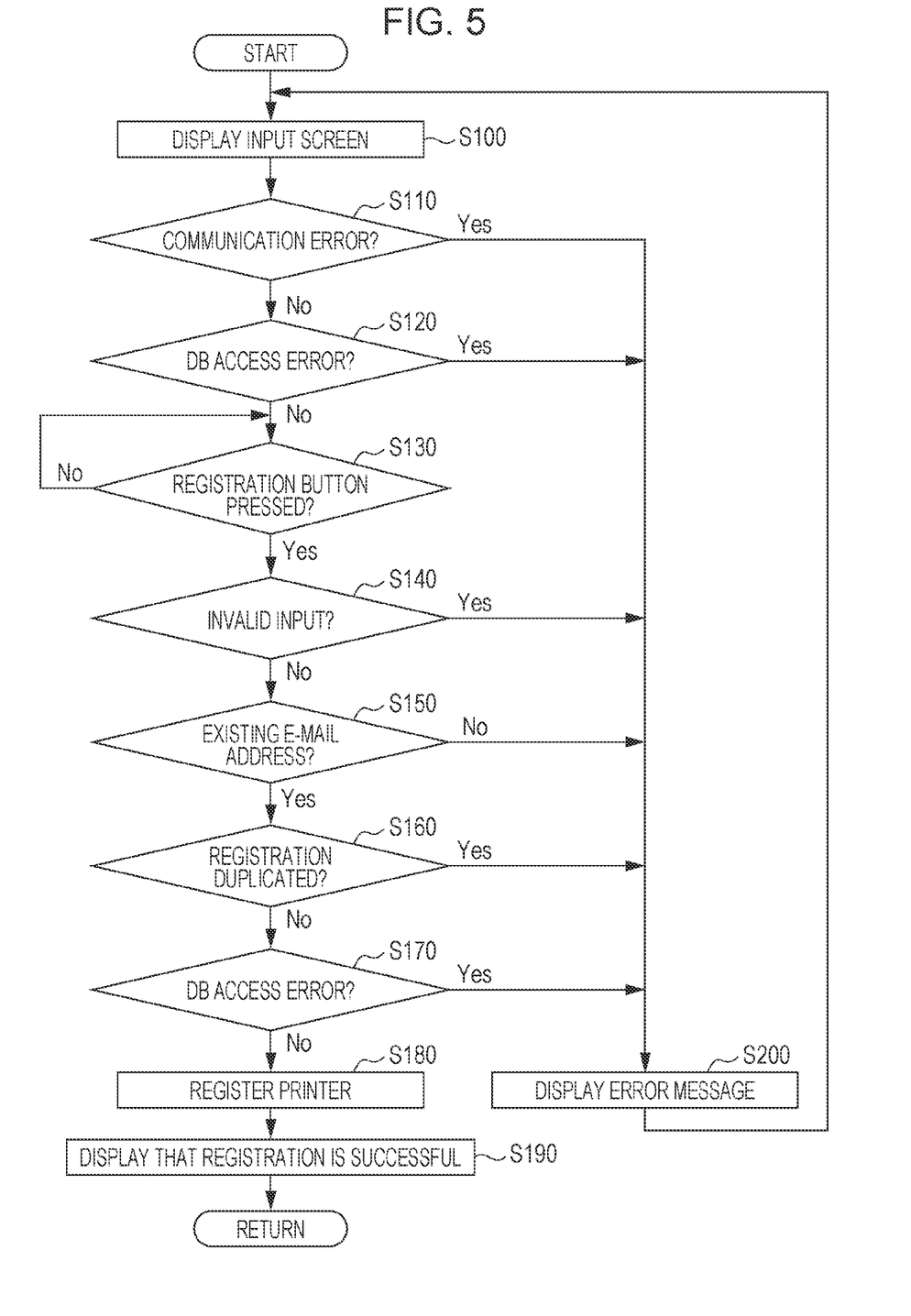
FIG. 5 is a flowchart illustrating a specific example of the process of Nos. 7 to 12 in FIG. 2.

FIG. 5 is a flowchart for explaining a specific example related to the processes of Nos. 7 to 12 in FIG. 2. As described above, the display controller 52 of the first server 50 causes the SNS server 40 to display the input screen 44 on the terminal device 30 by performing the process of No. 7 in FIG. 2 (step S100).

Subsequently, in step S110, the registration unit 54 determines whether a communication error with the second server 60 has occurred, and when the communication error has occurred, the process proceeds from the determination of "Yes" to step S200, and when no communication error has occurred, the process proceeds from the determination of "No" to step S120.

Subsequently, in step S120, the registration unit 54 determines whether an error has occurred in accessing the DB 61 of the second server 60, and when the access error has occurred, the process proceeds from the determination of "Yes" to step S200, and when no access error has occurred, the process proceeds from the determination of "No" to step S130.

In step S130, the acquisition unit 53 repeatedly determines whether the registration button 46 on the input screen 44 has been pressed based on the signal from the SNS server 40, and when it can be detected that the registration button 46 has been pressed, the process proceeds from the determination of "Yes" to step S140. The fact that the registration button 46 is pressed basically means that the acquisition unit 53 has acquired the target printer e-mail address.

In step S140, the registration unit 54 determines whether the information acquired as the target printer e-mail address is an invalid input. The invalid input here corresponds to, for example, character information that does not correspond to the printer e-mail address format. Further, when the user U pushes down the registration button 46 while the input field 45 of the input screen 44 is blank, the acquisition unit 53 acquires a substantially empty input, and such an empty input is a type of invalid input. When the registration unit 54 determines that the information acquired as the target printer e-mail address is an invalid input, the process proceeds from the determination of "Yes" to step S200, and when the registration unit 54 determines that the information is not an invalid input, the process proceeds from the determination of "No" to step S150.

In step S150, the registration unit 54 determines whether the target printer e-mail address is a printer e-mail address existing in the DB 61. That is, as described in the process of Nos. 10 and 11 in FIG. 2, the registration unit 54 determines whether the target printer e-mail address matches any of the printer e-mail addresses specified in the DB 61. When the registration unit 54 determines that the target printer e-mail address matches any of the printer e-mail addresses specified in the DB 61, the process proceeds from the determination of "Yes" to step S160 and when the registration unit 54 determines that the target printer e-mail address does not match any of the printer e-mail addresses specified in the DB 61, the process proceeds from the determination of "No" to step S200.

In step S160, the registration unit 54 determines whether the registration currently being performed corresponds to duplicate registration. The duplicate registration means that completely the same registration is performed in a state in which the account of the sender using the target printer e-mail address and the printer identified by the target printer e-mail address are registered in association with each other. The process proceeds from the determination of "Yes" to step S200 since duplicate registration will occur when the registration unit 54 determines that the account of the sender using the target printer e-mail address and the printer identified by the target printer e-mail address are already associated with each other, in consideration of the current status of association registration between the SNS account and the printer. On the other hand, when the registration unit 54 determines that the registration to be performed at present does not correspond to the duplicate registration, the process proceeds from the determination of "No" to step S170.

In step S170, the registration unit 54 determines whether an access error has occurred in the DB as the registration destination for the printer registration in step S180, and when the access error has occurred, the process proceeds from the determination of "Yes" to S200, and when no access error has occurred, the process proceeds from the determination of "No" to step S180. The registration destination DB may be, for example, the DB 61 of the second server 60, or the DB of the first server 50.

In step S180, as described in the process of No. 12 in FIG. 2, the registration unit 54 registers the account of the sender using the target printer e-mail address and the printer identified by the target printer e-mail address in the registration destination DB in association with each other.

Figure 6A:
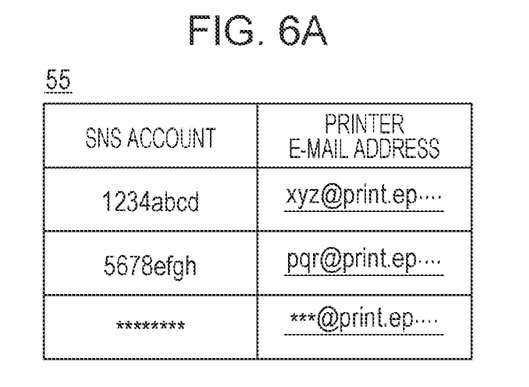
FIG. 6A is a diagram showing an example of an SNS printer registration DB of a first server.

FIG. 6A shows an example of an SNS printer registration DB 55 of the first server 50. The SNS printer registration DB

55 is a DB in which an SNS account and a printer e-mail address are registered in association with each other. That is, in step S180, the registration unit 54 may register the account of the sender using the target printer e-mail address and the target printer e-mail address in association with each other in the SNS printer registration DB 55. Since the printer e-mail address is information that uniquely identifies the printer, associating the account of the sender using the target printer e-mail address with the target printer e-mail address corresponds to associating the account of the sender using the target printer e-mail address with the printer identified by the target printer e-mail address.

Figure 6B:
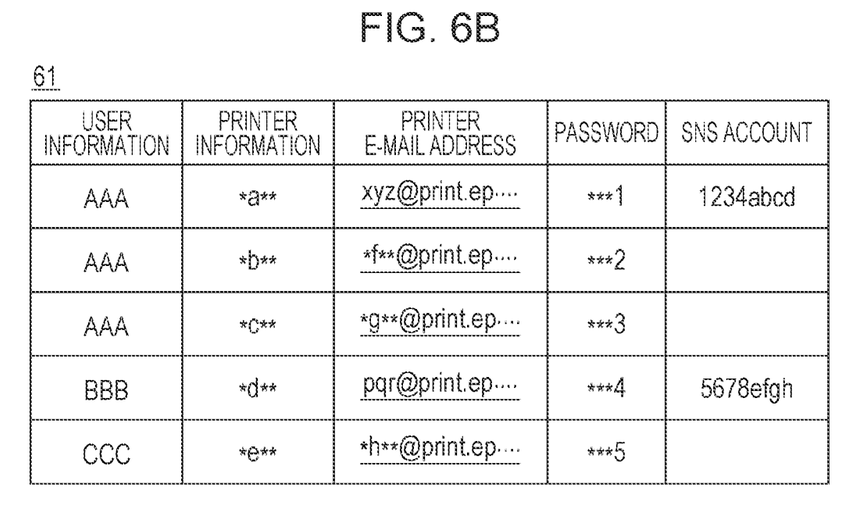
FIG. 6B is a diagram showing an example of a DB of a second server.

FIG. 6B shows an example of the DB 61 of the second server 60. The printer information in the DB 61 is information indicating each of a plurality of printers managed by the second server 60, for example, the printers 70, 71, 72, . . . and includes information such as a model name, a serial number, and an ID. That is, in the DB 61, the printer information and the printer e-mail address are associated one-to-one.

Further, in the DB 61, user information and a password are associated with each other for each printer. The user information in the DB 61 indicates a user who can enjoy the printing service provided by the second server 60 and who is permitted to use the associated printer. Therefore, a user who has the SNS account managed by the SNS server 40 and a user indicated by the user information of the DB 61 may not match. The user information of the DB 61 includes a user's name, a user ID, and other personal information.

The password in the DB 61 is a password arbitrarily set by a user who is permitted to use the associated printer. The password specified in the DB 61 is information different from the password as part of the information of the SNS account. Since the password and the user information in the DB 61 are necessary elements in at least one of the modifications described later, they are not essential throughout the present embodiment.

In step S180, the registration unit 54 may register the account of the sender using the target printer e-mail address and the printer identified by the target printer e-mail address in association with each other in the DB 61, instead of the SNS printer registration DB 55, as shown in FIG. 6B.

After step S180, in step S190, the display controller 52 may notify the account, for which the printer is registered in step S180, of a registration success message indicating that the printer registration is successful. In other words, the display controller 52 transmits a registration success message for the account, for which the printer is registered in step S180, to the SNS server 40 and then causes the SNS server 40 to display the registration success message on the display unit of the terminal device 30 in cooperation with the SNS application 31 so that the user U who is logging in to the SNS with this account can visually recognize the message. The first server 50 ends the flowchart of FIG. 5 through step S190.

In step S200, the display controller 52 may notify the account of the sender of the printer registration request of an error message indicating that the printer registration has failed. The account of the sender of the printer registration request is also the account of the sender using the target printer e-mail address. That is, the display controller 52 transmits an error message for the account of the sender of the printer registration request to the SNS server 40 and causes the SNS server 40 to display the error message on the display unit of the terminal device 30 in cooperation with the SNS application 31 so that the user U who is logging in to the SNS with this account can visually recognize the error message.

The display controller 52 may make the specific content of the error message different depending on which of steps S110, S120, S140, S150, S160, and S170 the determination immediately before reaching step S200 is. For example, when the determination is "No" in step S150 and the process reaches step S200, the display controller 52 may cause an error message to be displayed indicating that the printer e-mail address entered on the input screen 44 is not recorded in the DB 61.

As shown in FIG. 5, the display controller 52 returns the process to step S100 through step S200. That is, the display controller 52 may give the user U an opportunity to enter the printer e-mail address again by continuing the display of the input screen 44 after step S200.

In this way, the user U who succeeds in registration of the association between the SNS account and the printer posts a print instruction on any file to the SNS using the account thereafter, so that it is possible to perform printing on the file. That is, the SNS server 40 that has received the print instruction posted by the user U using the account transmits the print instruction to the first server 50. The first server 50 identifies the printer associated with the account of the sender performing the print instruction with reference to the SNS printer registration DB 55 and instructs the second server 60 to cause the identified printer to perform printing.

Alternatively, the first server 50 causes the second server 60 having the DB 61 to identify the printer associated with the account of the sender performing the print instruction. Further, the first server 50 instructs the second server 60 to cause the printer associated with the account of the sender performing the print instruction to perform printing based on the print instruction, and the second server 60 causes the printer associated with the account of the sender performing this print instruction to perform printing based on the print instruction.

3. Modification

Some modifications included in the embodiment will be described. A mode in which a plurality of modifications are combined is also part of the present embodiment.

First Modification

Figure 4B:
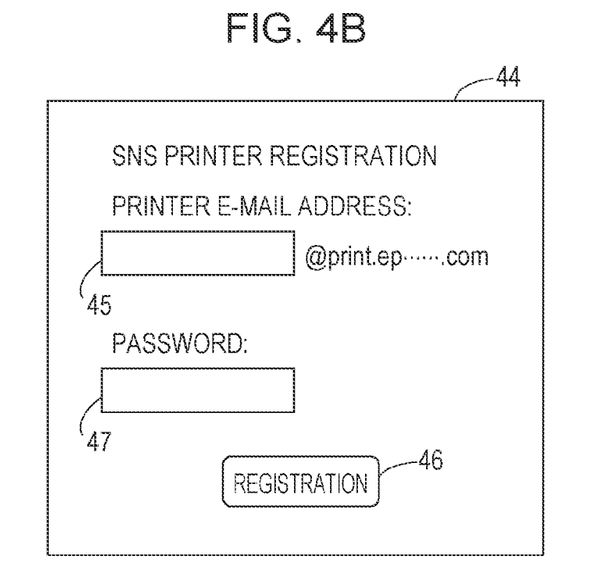
FIG. 4B is a diagram showing another example of the input screen.

FIG. 4B shows an example of an input screen 44 different from the input screen 44 shown in FIG. 4A. The input screen 44 of FIG. 4B differs from that of FIG. 4A in that the input screen 44 of FIG. 4B has an input field 47 of a password. The user U knows in advance a printer e-mail address of the printer that the user U wants to associate with the account and a password associated with this printer e-mail address. The user U enters the printer e-mail address in the input field 45 of the input screen 44, enters the password in the input field 47 of the input screen 44, and presses down the registration button 46. As a result, the printer e-mail address and the password entered on the input screen 44 are transmitted from the account to the first server 50 via the SNS server 40, and the acquisition unit 53 acquires the target printer e-mail address and the password.

In a first modification, the registration unit 54 refers to the DB 61 in the process of Nos. 10 to 12 in FIG. 2. When a combination of the target printer e-mail address and the password acquired by the acquisition unit 53 matches any of the combinations of the printer e-mail address and the password specified for each printer in DB 61, the account of the sender using the target printer e-mail address and the printer identified by the target printer e-mail address may be registered in association with each other. When the combination of the target printer e-mail address and the password acquired by the acquisition unit 53 does not match any of the combinations of the printer e-mail address and the password specified for each printer in DB 61, the registration unit 54 may make determination of "No" in step S150.

Second Modification

In a second modification, the registration unit 54 refers to the DB 61 in the process of Nos. 10 to 12 in FIG. 2. When the target printer e-mail address matches any of the printer e-mail addresses specified in the DB 61, and when the user information associated with this printer e-mail address in the DB 61 and the user U indicated by the account of the sender using the target printer e-mail address match, the registration unit 54 may register the account of the sender and the printer identified by the target printer e-mail address in association with each other.

Matching the user information of the DB 61 with the user U indicated by the SNS account means that, for example, the user's name or at least part of personal information matches. The registration unit 54 can inquire the SNS server 40 about the detailed contents of the SNS account as needed. When the user information, in the DB 61, associated with a printer e-mail address matching the target printer e-mail address and the user U indicated by the account of the sender using the target printer e-mail address do not match, the registration unit 54 may make determination of "No" in S150.

Third Modification

Figure 7:
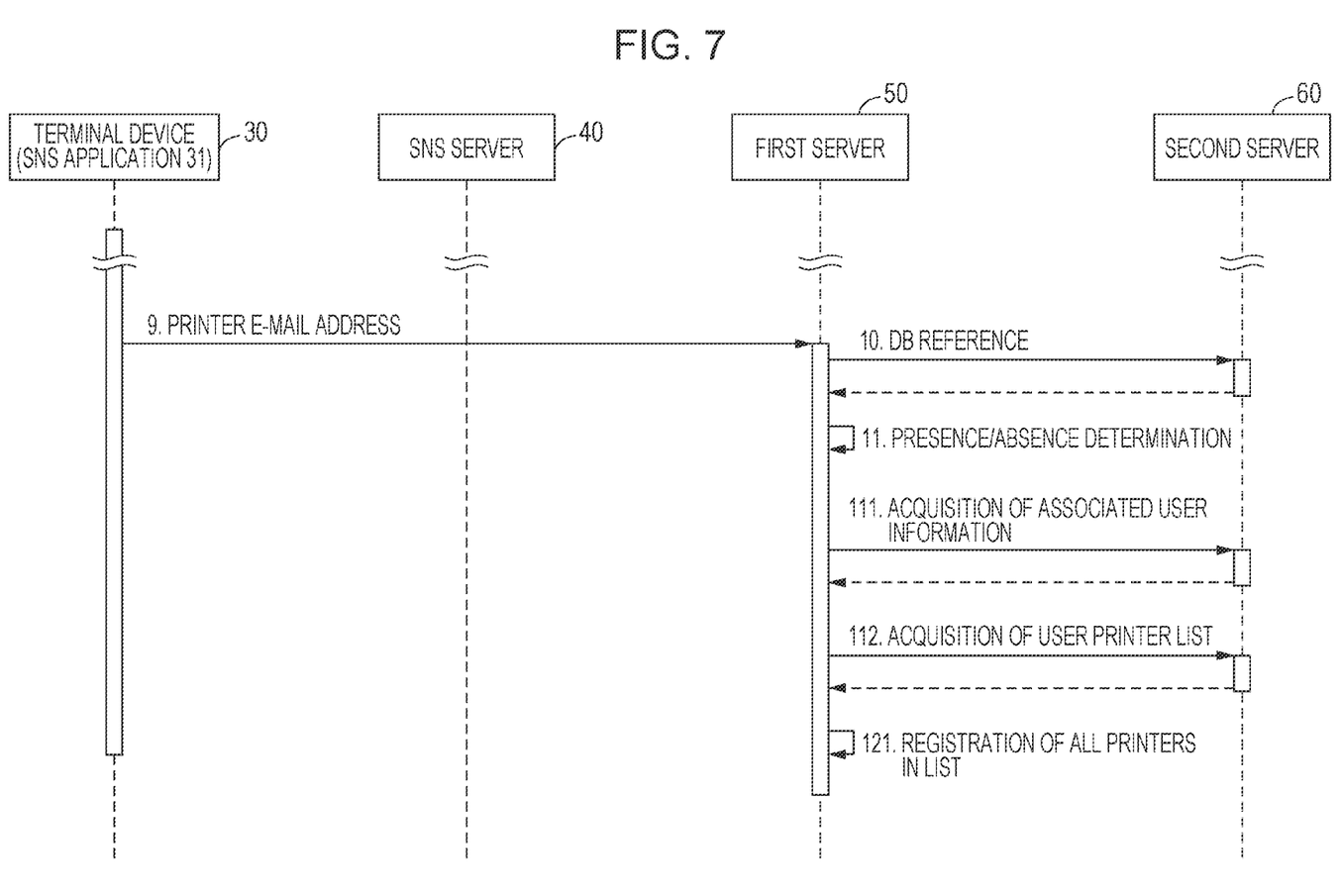
FIG. 7 is a sequence diagram showing a printer registration process according to a third modification.

FIG. 7 shows a sequence diagram according to a third modification. Since the processes up to "11. Presence/absence determination" are common between FIG. 2 and FIG. 7, most of the descriptions common to FIG. 2 and FIG. 7 are omitted in FIG. 7. As shown in FIG. 7, the registration unit 54 accesses the DB 61 of the second server 60 and performs "111. Acquisition of associated user information". The associated user information referred to here is user information, in the DB 61, associated with the printer e-mail address that matches the target printer e-mail address, and the registration unit 54 acquires the associated user information. Next, the registration unit 54 accesses the DB 61 and performs "112. Acquisition of user printer list". The user printer list referred to here means a list of printers associated with the associated user information in the DB 61.

For example, it is assumed that the printer e-mail address "xyz@print.ep . . . " specified in DB 61 of FIG. 6B matches the target printer e-mail address. In this case, the user information "AAA" is the associated user information. Further, in the DB 61, the user information "AAA" is associated with the printer information of three different printers. Therefore, the printer information for three printers associated with the user information "AAA" corresponds to the user printer list.

The registration unit 54 performs "121. Registration of all printers in the list". That is, the registration unit 54 registers the account of the sender using the target printer e-mail address in association with all the printers in the user printer list. In the example of FIG. 6B, the account "1234abcd" of the sender using the target printer e-mail address is registered in association with only the printer identified by the printer e-mail address "xyz@print.ep . . . ". In addition to this, in the third modification, the account "1234abcd" is registered in association with the printer of each of the printer e-mail addresses "*f**@print.ep . . . " and "*g**@print.ep . . . " which have, in common, the user information "AAA" associated with the printer e-mail address "xyz@print.ep . . . ".

Fourth Modification

Figure 8:
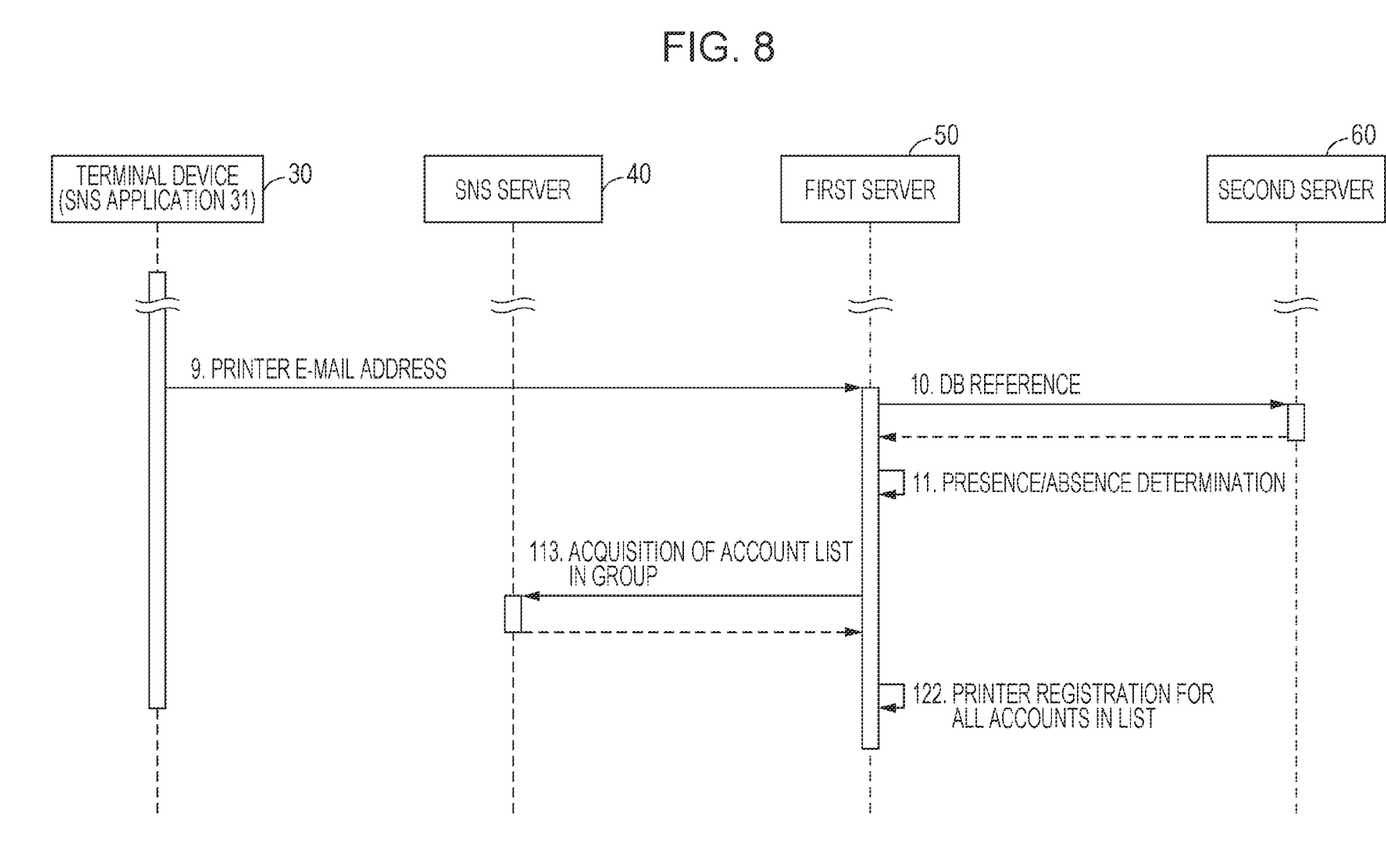
FIG. 8 is a sequence diagram showing a printer registration process according to a fourth modification.

FIG. 8 shows a sequence diagram according to a fourth modification. Similarly to FIG. 7, since the processes up to "11. Presence/absence determination" are common between FIG. 2 and FIG. 8, most of the descriptions common to FIG. 2 and FIG. 8 are omitted in FIG. 8. The fourth modification will be described on the assumption that the target printer e-mail address matches any of the printer e-mail addresses specified in DB 61. As shown in FIG. 8, the registration unit 54 accesses the SNS server 40 and performs "113. Acquisition of account list in group". The account list in a group is a list of the account of the sender using the target printer e-mail address and accounts of members of the same group chat in the SNS. Of course, the account list in the group includes the account of the sender using the target printer e-mail address.

After acquiring such an account list in the group, the registration unit 54 performs "122. Printer registration for all accounts in the list". That is, the registration unit 54 registers all accounts, listed in the account list in the group, each of which is associated with the printer identified by the target printer e-mail address. According to the fourth modification, when receiving an input of the printer e-mail address from one of the accounts belonging to a group chat in the SNS, the print control server can associate each account belonging to the group chat with the printer identified by the printer e-mail address. Therefore, it is possible to reduce the time and effort for each user of the SNS who has an account belonging to the group chat to register the printer.

4. Summary

As described above, according to the present embodiment, the print control server controls printing via the SNS and includes the display controller 52 that causes, when a printer registration request is received from the account of the user U of the SNS, the SNS server 40 that manages the SNS to display, on the terminal device 30 operated by the user U, the input screen 44 on which the printer e-mail address that uniquely identifies a printer is entered, the acquisition unit 53 that acquires the printer e-mail address entered on the input screen 44, and the registration unit 54 that refers to the DB 61 which specifies, in advance, a correspondence relationship with a printer e-mail address with respect to a plurality of printers and registers, when the printer e-mail address acquired by the acquisition unit 53 matches any of the printer e-mail addresses specified in the DB 61, the account and the printer identified by the printer e-mail address acquired by the acquisition unit 53 in association with each other.

According to the above configuration, the print control server can register the SNS account and the printer in association with each other by causing the user U of the SNS to enter the printer e-mail address on the input screen 44 with the SNS account. That is, the user U can easily register the printer required for printing via the SNS. Further, unlike the related art, a complicated procedure such as activating a camera and capturing a code of an image in order to post the printer ID is unnecessary, and the burden on the user is reduced.

Further, according to the present embodiment, when the printer e-mail address acquired by the acquisition unit 53 does not match any of the printer e-mail addresses specified in the DB 61, the display controller 52 may cause the SNS server 40 to display an error message and the input screen 44 on the terminal device 30. According to the above configuration, when the printer e-mail address entered by the user U is not specified in the DB 61, the print control server can cause the user U to recognize the error and further, prompt the user U to enter the appropriate printer e-mail address.

Further, according to the present embodiment, when the registration unit 54 registers the account and the printer in association with each other, the display controller 52 may cause the SNS server 40 to display, on the terminal device 30, a message stating that printer registration is successful. According to the above configuration, the print control server can cause the user U to recognize the success when the SNS account and the printer can be associated and registered by entering the printer e-mail address.

Further, according to the present embodiment, when the user posts, by using the account, the printer registration request on the chat screen 41 provided by the SNS, the display controller 52 may cause link information, which guides the user U to the input screen 44, to be displayed on the chat screen 41 and, when the link information is selected, the display controller 52 may cause the input screen 44 to be displayed. According to the above configuration, the user U can easily display the input screen 44 of the printer e-mail address via a chat with the print control server.

Further, according to the present embodiment, the DB 61 may specify, in advance, a correspondence relationship between a printer e-mail address and a password. According to the first modification, the display controller 52 causes the input screen 44 to be displayed on which a printer e-mail address and a password are entered, and the acquisition unit 53 acquires the printer e-mail address and the password entered on the input screen 44. The registration unit 54 refers to the DB 61 and registers, when a combination of the printer e-mail address and the password acquired by the acquisition unit 53 matches a combination of any printer e-mail address and any password specified in the DB 61, the account and the printer identified by the printer e-mail address acquired by the acquisition unit 53 in association with each other. According to the first modification, the print control server can prohibit unauthorized association between the SNS account of the third party and the printer by authenticating the user U using the password.

Further, according to the present embodiment, the DB 61 may specify, in advance, a correspondence relationship between a printer and a user who is permitted to use each printer. According to the second modification, when the DB 61 specifies a printer e-mail address that matches the printer e-mail address acquired by the acquisition unit 53 and when a user who is permitted to use a printer associated with the printer e-mail address and the user indicated by the account match, the registration unit 54 registers the account and the printer identified by the printer e-mail address acquired by the acquisition unit 53 in association with each other. According to the second modification, the print control server can prohibit the association between the SNS account of a third party who is not permitted to use a printer and the printer.

Further, according to the third modification, when the registration unit 54 registers the account and the printer identified by the printer e-mail address acquired by the acquisition unit 53 in association with each other, the registration unit 54 acquires information of a user who is permitted to use a printer associated, in the DB 61, with the printer e-mail address acquired by the acquisition unit 53 and registers a plurality of printers specified in the DB 61 in association with the account of the user permitted to use the printer. According to the third modification, when the user is permitted to use a plurality of printers, triggered by the input of the printer e-mail address associated with one printer of the plurality of printers, the print control server can register the SNS account and the plurality of printers in association with each other.

In addition to the print control server, the present embodiment discloses the disclosures in various categories such as a system, a method, and a program. For example, the printing system 90 includes the first server 50 communicably connected to the SNS and the second server 60 that includes the DB 61, which specifies, in advance, a correspondence relationship with a printer e-mail address that uniquely identifies the printer with respect to a plurality of printers communicably connected, and that causes a printer designated among the plurality of printers to perform printing. The first server 50 causes, when a printer registration request is received from an account of the user U of the SNS, the SNS server 40 that manages the SNS to display, on the terminal device 30 operated by the user U, the input screen 44 on which a printer e-mail address is entered, acquires the printer e-mail address entered on the input screen 44, and refers to the DB 61 and registers, when the printer e-mail address acquired matches any printer e-mail address specified in the DB 61, the account and the printer identified by the printer e-mail address acquired in association with each other.

Further, in a print control method of controlling printing via the SNS, the method includes a display control step of causing, when a printer registration request is received from an account of the user U of the SNS, the SNS server 40 that manages the SNS to display, on the terminal device 30 operated by the user U, an input screen 44 on which a printer e-mail address that uniquely identifies a printer is entered, an acquisition step of acquiring the printer e-mail address entered on the input screen 44, and a registration step of referring to the DB 61 that specifies, in advance, a correspondence relationship with a printer e-mail address with respect to a plurality of printers and registering, when the printer e-mail address acquired matches any printer e-mail address specified in the DB 61, the account and the printer identified by the acquired printer e-mail address in association with each other.

What is claimed is:

1. A print control server that controls printing via a social networking service (SNS), the print control server comprising:
    a display controller that causes, when a printer registration request is received on a chat screen from an account of a user of the SNS, an SNS server that manages the SNS to display, on a terminal device operated by the user, link information, which guides the user to an input screen displayed on the chat screen and, when the link information is selected, the display controller causes the input screen to be displayed on which an e-mail address that uniquely identifies a printer is entered;
    an acquisition unit that acquires the e-mail address entered on the input screen; and
    a registration unit that refers to a database which specifies, in advance, a correspondence relationship with an e-mail address with respect to a plurality of printers and that registers, when the e-mail address acquired by the acquisition unit matches any e-mail address specified in the database, the account in association with the printer identified by the e-mail address acquired by the acquisition unit.

2. The print control server according to claim 1, wherein when the e-mail address acquired by the acquisition unit does not match any e-mail address specified in the database, the display controller causes the SNS server to display an error message and the input screen on the terminal device.

3. The print control server according to claim 1, wherein when the registration unit registers the account in association with the printer, the display controller causes the SNS server to display, on the terminal device, a message stating that printer registration is successful.

4. A print control server that controls printing via a social networking service (SNS), the print control server comprising:
a display controller that causes, when a printer registration request is received on a chat screen from an account of a user of the SNS, an SNS server that manages the SNS to display, on a terminal device operated by the user, link information, which guides the user to an input screen displayed on the chat screen and, when the link information is selected, the display controller causes the input screen to be displayed on which an e-mail address that uniquely identifies a printer is entered;
an acquisition unit that acquires the e-mail address entered on the input screen; and
a registration unit that refers to a database which specifies, in advance, a correspondence relationship with an e-mail address with respect to a plurality of printers and that registers, when the e-mail address acquired by the acquisition unit matches any e-mail address specified in the database, the account in association with the printer identified by the e-mail address acquired by the acquisition unit,
wherein
the database specifies, in advance, a correspondence relationship between an e-mail address and a password,
the display controller causes the input screen to be displayed on which an e-mail address and a password are entered,
the acquisition unit acquires the e-mail address and the password entered on the input screen, and
the registration unit refers to the database and registers, when a combination of the e-mail address and the password acquired by the acquisition unit matches a combination of any e-mail address and any password specified in the database, the account in association with the printer identified by the e-mail address acquired by the acquisition unit.

5. A print control server that controls printing via a social networking service (SNS), the print control server comprising:
a display controller that causes, when a printer registration request is received on a chat screen from an account of a user of the SNS, an SNS server that manages the SNS to display, on a terminal device operated by the user, link information, which guides the user to an input screen displayed on the chat screen and, when the link information is selected, the display controller causes the input screen to be displayed on which an e-mail address that uniquely identifies a printer is entered;
an acquisition unit that acquires the e-mail address entered on the input screen; and
a registration unit that refers to a database which specifies, in advance, a correspondence relationship with an e-mail address with respect to a plurality of printers and that registers, when the e-mail address acquired by the acquisition unit matches any e-mail address specified in the database, the account in association with the printer identified by the e-mail address acquired by the acquisition unit,
wherein
the database specifies, in advance, a correspondence relationship between a printer and a user who is permitted to use each printer, and
when the database specifies an e-mail address that matches the e-mail address acquired by the acquisition unit and when a user who is permitted to use a printer associated with the e-mail address and the user indicated by the account match, the registration unit registers the account in association with the printer identified by the e-mail address acquired by the acquisition unit.

6. A print control server that controls printing via a social networking service (SNS), the print control server comprising:
a display controller that causes, when a printer registration request is received on a chat screen from an account of a user of the SNS, an SNS server that manages the SNS to display, on a terminal device operated by the user, link information, which guides the user to an input screen displayed on the chat screen and, when the link information is selected, the display controller causes the input screen to be displayed on which an e-mail address that uniquely identifies a printer is entered;
an acquisition unit that acquires the e-mail address entered on the input screen; and
a registration unit that refers to a database which specifies, in advance, a correspondence relationship with an e-mail address with respect to a plurality of printers and that registers, when the e-mail address acquired by the acquisition unit matches any e-mail address specified in the database, the account in association with the printer identified by the e-mail address acquired by the acquisition unit,
wherein
the database specifies, in advance, a correspondence relationship between a printer and a user who is permitted to use each printer, and
when the registration unit registers the account in association with the printer identified by the e-mail address acquired by the acquisition unit, the registration unit acquires information of a user who is permitted to use a printer associated, in the database, with the e-mail address acquired by the acquisition unit and registers a plurality of printers specified in the database in association with the account of the user permitted to use the printer.

7. A printing system comprising:
a first server configured to be connected, for communication, to a social networking service (SNS); and
a second server that includes a database, which specifies, in advance, a correspondence relationship with an e-mail address that uniquely identifies a printer with respect to a plurality of printers configured to be connected for communication, and that causes a printer designated among the plurality of printers to perform printing, wherein
the first server causes, when a printer registration request is received from an account of a user of the SNS, an SNS server that manages the SNS to display, on a terminal device operated by user, an input screen on which an e-mail address of a printer is entered, acquires the e-mail address entered on the input screen, and refers to the database and registers, when the e-mail address acquired matches any e-mail address specified in the database, the account in association with the printer identified by the e-mail address acquired, wherein the database specifies, in advance, a correspondence relationship between each printer and a user who is permitted to use each printer, and when the database specifies an e-mail address that matches the acquired e-mail address and when a user who is permitted to use a primer associated with die e-mail address and the user indicated by the account match, the account is registered in association with the printer identified by the acquired e-mail address.

8. A print control method of controlling printing via a social networking service (SNS), the method comprising:

a display control step of causing, when a printer registration request is received from an account of a user of the SNS, an SNS server that manages the SNS to display, on a terminal device operated by the user, an input screen on which an e-mail address that uniquely identifies a printer is entered;

an acquisition step of acquiring the e-mail address entered on the input screen, and a registration step of referring to a database that specifies, in advance, a correspondence relationship with an e-mail address with respect to a plurality of printers and registering, when the e-mail address acquired in the acquisition step matches any e-mail address specified in the database, the account in association with the printer identified by the e-mail address acquired in the acquisition step, wherein the database specifies, in advance, a correspondence relationship between each printer and a user who is permitted to use each printer, and when the database specifies an e-mail address that matches the acquired e-mail address and when a user who is permitted to use a primer associated with die e-mail address and the user indicated by the account match, the account is registered in association with the printer identified by the acquired e-mail address.

\* \* \* \* \*